United States Patent [19]
Lockhart et al.

[11] Patent Number: 5,666,107
[45] Date of Patent: Sep. 9, 1997

[54] METHOD AND APPARATUS FOR EFFICIENT ROAMING AMONG COMMUNICATION SYSTEM

[75] Inventors: Robert Lockhart, Boynton Beach; Eric Thomas Eaton, Lake Worth, both of Fla.

[73] Assignee: Motorola, Inc., Schaumburg, Ill.

[21] Appl. No.: 531,362

[22] Filed: Sep. 20, 1995

[51] Int. Cl.⁶ ............... H04B 3/38; H04B 1/00; G08B 5/22; H04M 11/00
[52] U.S. Cl. .............. 340/827; 340/825.44; 455/433
[58] Field of Search ............ 340/825.44, 827; 379/59, 58, 57; 455/33.1, 33.2, 56.1, 54.1

[56] References Cited

U.S. PATENT DOCUMENTS

| | | |
|---|---|---|
| 4,178,476 | 12/1979 | Frost. |
| 4,644,347 | 2/1987 | Lucas et al.. |
| 4,644,351 | 2/1987 | Zabarsky et al. ........... 340/825.44 |
| 4,910,511 | 3/1990 | Nagata et al.. |
| 4,978,944 | 12/1990 | Andros et al. ........... 340/825.44 |
| 5,196,842 | 3/1993 | Gomez et al. ........... 340/825.44 |
| 5,440,614 | 8/1995 | Sonberg et al. ........... 455/33.2 |
| 5,506,886 | 4/1996 | Maine et al. ........... 379/57 |

OTHER PUBLICATIONS

Strawman for Automatic Roaming, Jun. 18, 1985, Electronic Industries Association, TR-45.2 Cellular System Operation.

*Primary Examiner*—Michael Horabik
*Assistant Examiner*—Edward Merz
*Attorney, Agent, or Firm*—Gregg Rasor; Kelly A. Gardner

[57] ABSTRACT

A communication system (100) for providing messages to a pager (140) includes a first sub-system (105) having a home terminal (125) for normally transmitting the messages to the pager (140) in a first geographic region. The communication system (100) also includes a second sub-system (115) having a local terminal (135) for transmitting the messages to the pager (140) when the pager (140) has roamed into a second geographic region. The local terminal (135) of the second sub-system (115) includes a data port (505) for receiving a message for transmission to the pager (140), a controller (510) for determining that the pager is roaming, and a requester (580) for automatically transmitting a request for a subscriber record associated with the pager (140) from the first sub-system (105) in response to determining that the pager (140) is roaming.

16 Claims, 9 Drawing Sheets

METHOD AND APPARATUS FOR EFFICIENT ROAMING AMONG COMMUNICATION SYSTEM

FIELD OF THE INVENTION

This invention relates in general to communication systems, and more specifically to roaming among communication systems.

BACKGROUND OF THE INVENTION

In communication systems, such as radio paging systems, messages are transmitted to subscribers via pagers or other portable radio communication devices. Generally, a person subscribes for service in a particular geographic area by signing up with a service provider operating in the geographic area. The service provider then furnishes the subscriber with a pager for receiving messages. Subscriber information, i.e., a subscriber record, associated with the pager is entered by the provider into a "home" terminal so that specifications about the pager and about the needs of the subscriber can be utilized for messaging. The subscriber record can, for example, include a pager identification number (pager ID), addresses associated with the pager; types of messages, e.g., alphanumeric, tone only, voice, etc., associated with the different addresses, and billing information. Additionally, when the pager receives messages that are transmitted in the conventional FLEX™ signaling format, the subscriber record can store collapse values, a home frame, and frame offset values for messaging at different frequencies.

When arrangements have been made between different service providers, a subscriber can roam out of his usual geographic area into a different geographic area serviced by another provider and still receive messages. When someone calls into the local terminal associated with the new region and enters a message to be transmitted to the subscriber's pager, though, the local terminal cannot transmit the message immediately because it does not have the pager's address, home frame, frequency offset values, or message formats stored locally. Therefore, in a conventional system, the local terminal must request message validation by sending the request, along with the message, to all other service providers from which the subscriber could have roamed. The home terminal receives the request and the message and then formats the message according to the subscriber record associated with the roaming pager. The formatted message is returned to the local terminal. The home terminal must also send additional information, such as frequency offset values, collapse values, and the home frame assigned to the roaming pager. Once all of this information has been received by the local terminal, the message can finally be transmitted to the roamer.

Conventionally, this procedure occurs every time the local terminal receives a message for transmission to the roamer. This is a relatively inefficient process that can crowd the communication links between terminals and result in backlogs. Furthermore; the process is time consuming, resulting in delay of message reception for the roamer. When the roaming subscriber has a need to receive urgent messages, e.g., when the pager is carried by a doctor or a police officer, such delays can be critical.

Thus, what is needed is a method and apparatus for efficient roaming between communication systems.

DESCRIPTION OF A PREFERRED EMBODIMENT

Figure 1:
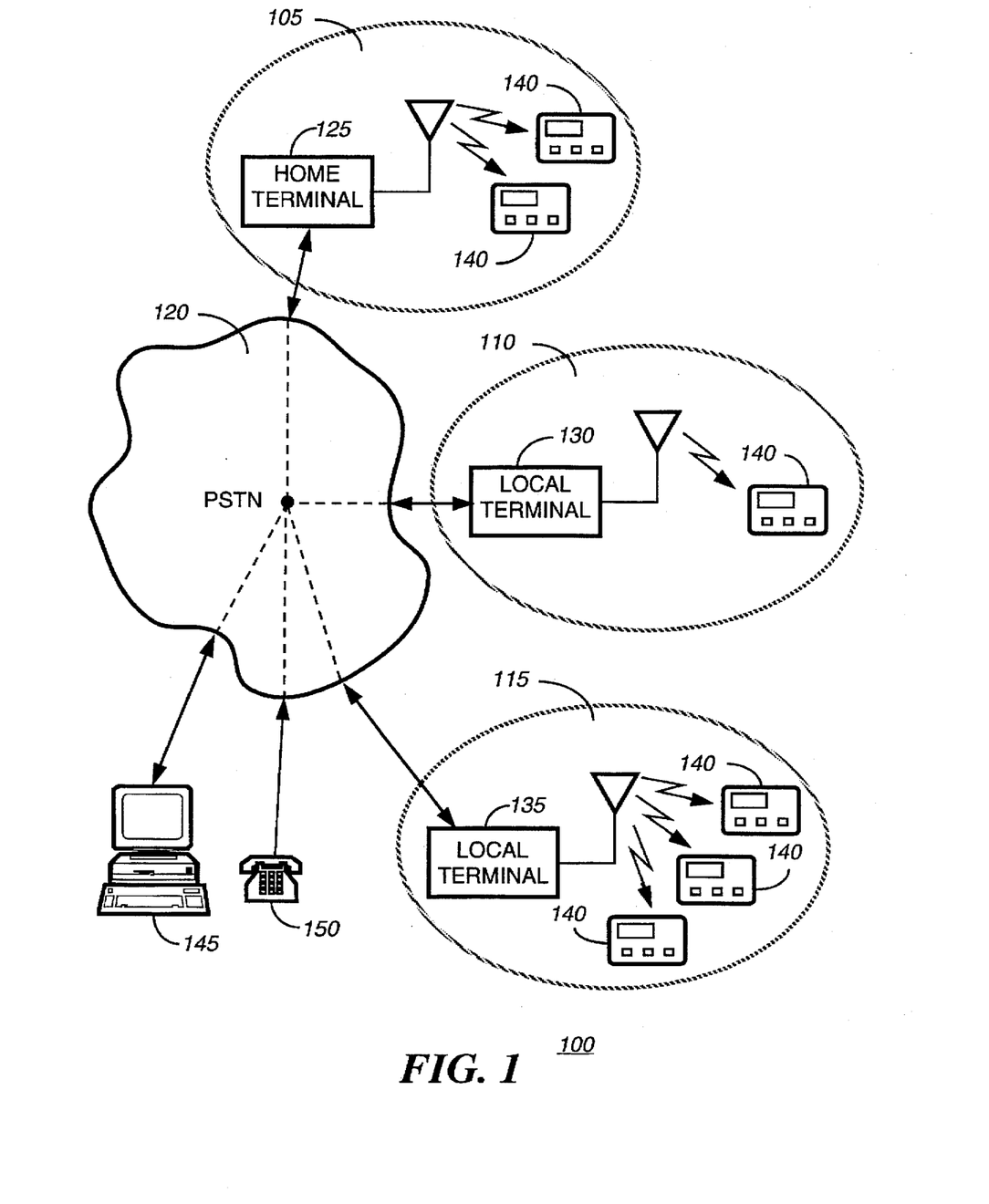
FIG. 1 is a diagram of a communication system comprising a plurality of communication sub-systems for providing messages within predetermined, geographic areas according to the present invention.

FIG. 1 is a communication system 100 comprising a plurality of communication sub-systems 105, 110, 115 operated by service providers for providing messaging service within predetermined geographic regions, which are represented by dashed lines. Each sub-system 105, 110, 115 comprises at least one terminal 125, 130, 135 for transmitting messages to portable communication devices, such as pagers 140, which receive and present the messages to system subscribers. Pagers 140 usually receive messages within a specified geographic area. However, according to the present invention, a pager 140 can "roam" into other regions and still receive messages. For example, a pager 140 that subscribes to a service provider in a first sub-system 105 normally receives messages transmitted by the terminal 125, which is referred to as a "home" terminal, in a first geographic area. When a pager subscribing to service in the first sub-system 105 roams into a second sub-system 115, messages intended for the roaming pager 140, i.e., the roamer, are temporarily transmitted by the terminal 135, which is referred to as a "local" terminal, in a second geographic area.

Preferably, the sub-systems 105, 110, 115 can communicate through a communication link. By way of example, the terminals 125, 130, 135 can be coupled by a telephone network such as the Public Switched Telephone Network (PSTN) 120. Messages are originated by a calling party who enters message information into the communication system 100 by contacting a terminal 125, 130, 135 associated with a recipient pager 140. For instance, a calling party can provide message information and pager identification information, such as a pager address, to a terminal 125, 130, 135 via a conventional telephone 150 coupled to the PSTN 120. A message comprising message information and pager identification information can alternatively be provided through use of other input devices, such as a personal computer 145 coupled to the PSTN 120 by a modem (not shown).

Although only three sub-systems 105, 110, 115 are depicted, it will be appreciated that any number of sub-systems 105, 110, 115 associated with different service providers can be included in the communication system 100. Furthermore, the sub-systems 105, 110, 115 need not be geographically near to one another. For example, the first sub-system 105 could provide service within Miami, while the second sub-system 110 could provide service within Tokyo.

Figure 2:
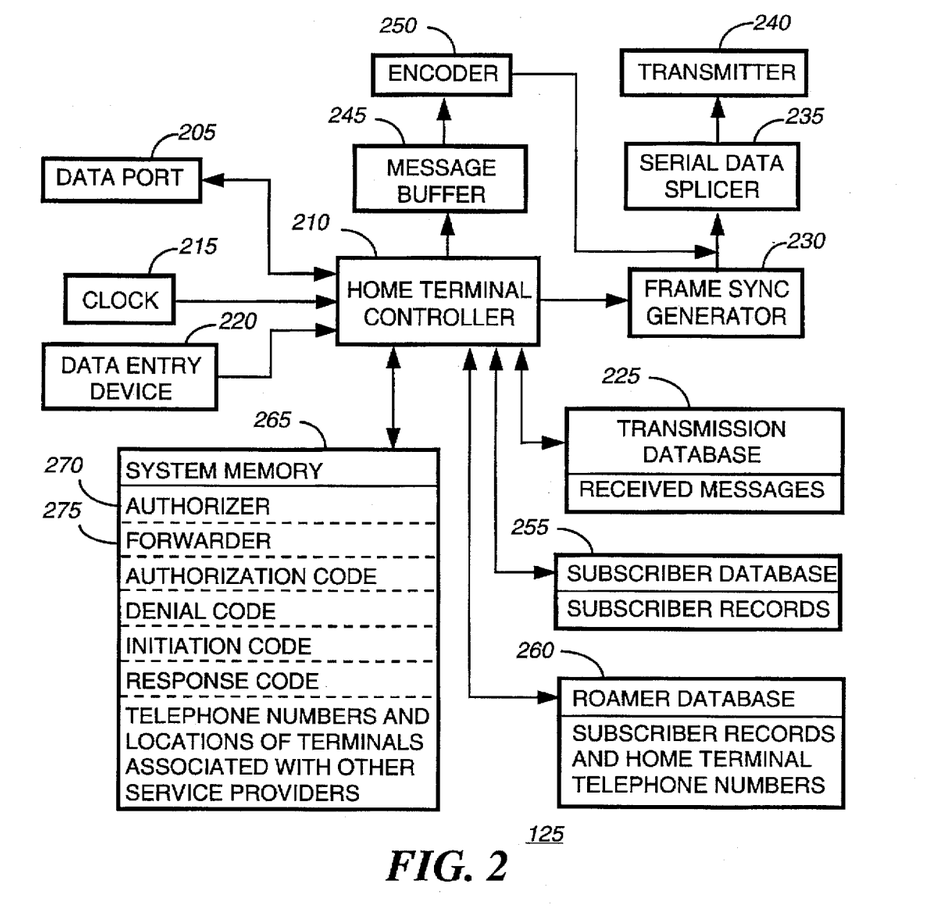
FIG. 2 is an electrical block diagram of a home terminal included in a first sub-system of FIG. 1 for normally transmitting messages to a pager according to the present invention.

FIG. 2 is an electrical block diagram of the home terminal 125 for normally transmitting messages to a pager 140 within the communication sub-system 105 (FIG. 1). The home terminal 125 preferably comprises a data port 205 for receiving information, including messages. It will be appreciated that other means of receiving information, such as modems, direct links with other devices, or radio receivers, could also be used to receive information from outside the terminal 125. The data port 205 is coupled to a controller 210 for processing information, and a transmission database 225 is coupled to the controller 210 for storing messages for transmission to pagers 140.

The terminal 125 further includes a clock 215 for providing time values to the controller 210 and a subscriber database 255 for storing information about system subscribers in the form of "subscriber records." A data entry device 220 is coupled to the controller 210 for updating the subscriber records. A roamer database 260 coupled to the controller 210 stores records for pagers 140 that have roamed into the sub-system 105 and telephone numbers for the home terminals associated with the roamers.

Further included in the terminal 125 is a system memory 265 for storing codes, values, and firmware used in operating the terminal 125. Preferably, the system memory 265 stores telephone numbers and locations of terminals 130, 135 that transmit in other sub-systems 110, 115 of the communication system 100. It will be appreciated that telephone numbers are described for use in contacting other terminals when the terminals are coupled by the PSTN 120. Other terminal identification information could alternatively be stored and utilized when the terminals are coupled by different types of communication links. For example, when the terminals are hardwired together, identification information other than telephone numbers may be appropriate.

Preferably, the system memory 265 further stores authorization and denial codes for authorizing or denying continued service for roaming pagers 140 and initiation and response codes used in forwarding information to other terminals, as will be explained in greater detail below. An authorizer 270 uses the authorization and denial codes to authorize or deny service based upon billing information stored in the subscriber record for a roaming pager 140, and a forwarder 275 forwards subscriber records for roamers according to the present invention. The authorizer 270 and the forwarder 275 can be implemented as firmware stored in the system memory 265 or, alternatively, as hardware capable of performing equivalent operations.

Messages are preferably transmitted by the terminal 125 using the conventional FLEX™ signaling protocol, according to which a radio signal is divided into cycles of one-hundred-twenty-eight (128) frames, each including a predetermined synchronization pattern (sync) and a plurality of words. When the radio signal is to be transmitted at 1600 bits per second, for example, eighty-eight words are included in each FLEX™ frame. These eighty-eight words are usually divided into an address field, which includes address of the pagers 140 to which messages are being transmitted, a vector field following the address field, and a message field in which message information is located. Some addresses, such as those referring numeric or alphanumeric message information, refer to a vector contained in the vector field, which specifies an area within the message field wherein corresponding message information is located.

The controller 210 gathers information to be transmitted during each frame into address, vector, and message fields according to FLEX™ protocol. The information is then coupled to a message buffer 245 for temporarily storing the information until a time for further processing and transmission. Frames are transmitted in numeric sequence, so that while a current frame is being transmitted, information for the next frame to be transmitted is in the message buffer 245, and information for the next frame thereafter is being gathered by the controller 210. At the appropriate time, the information stored in the message buffer 245 is transferred to the encoder 250 for encoding the information into a conventional signaling format such as FLEX™.

The controller 210 next enables a frame sync generator 230, which generates the predetermined sync pattern that is transmitted at the start of each frame transmission. The sync pattern is multiplexed with the encoded information by the serial data splicer 235, which generates a message stream. The message stream is transmitted by a transmitter 240 as a radio signal for reception by pagers 140 located in the geographic region in which service is provided by the sub-system 105.

Figure 3:
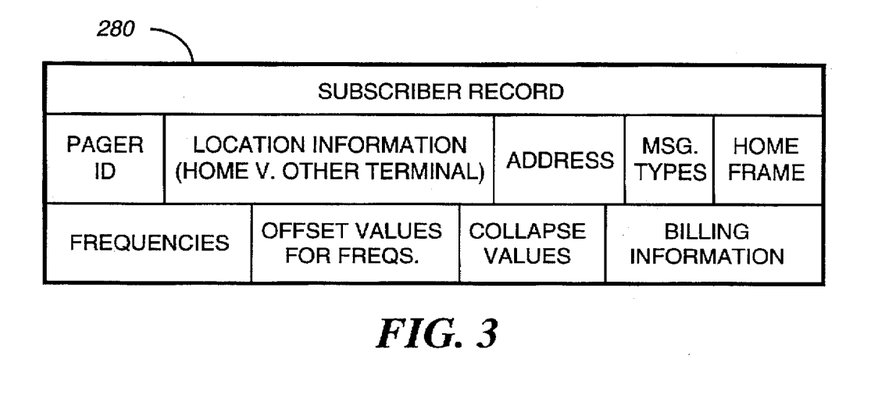
FIG. 3 is a diagram of a subscriber record that is associated with the pager and that is normally stored in the home terminal of FIG. 2 in accordance with the present invention.

Referring next to FIG. 3, an example of a subscriber record 280 that can be stored in the subscriber database 255 is depicted. The subscriber record 280 preferably includes pager identification information, which could be a subscriber identification number or an address. The subscriber record 280 further includes addresses associated with a pager 140, types of messages, e.g., numeric, voice, alphanumeric, and tone only, that can be received by the pager 140, and billing information associated with the pager 140. Additionally, a home frame assigned to the pager 140, collapse values, frequencies on which messages can be received, and offset values associated with each frequency are stored in the subscriber record 280. The subscriber record 280 preferably includes all information necessary for processing messages and providing messaging service for a particular pager.

According to the present invention, the home terminal 125 for a pager 140 normally provides messages to the pager 140 in accordance with the subscriber record for that pager 140. When the subscriber of that pager 140 desires to travel to another location and still receive messages, the subscriber calls the terminal 125 and enters information indicative of his travel location. This can be in the form of a city name, a selected service provider, identification information such as an area code or a country code, or any other information sufficient for identification of the sub-system, such as sub-system 115, into which the subscriber intends to roam.

Once the subscriber has relocated, people can contact, such as by telephoning, the local terminal 135 to send a message to the roaming pager 140. Upon determining that the pager 140 carried by the subscriber does not normally receive message from the local terminal 135, the local terminal 135 automatically transmits a record request, including at least pager identification information, to other terminals from which pagers can roam. The home terminal 125 for the pager 140 responds to the record request by automatically transmitting the entire subscriber record for the pager 140 to the local terminal 135. In this manner, the local terminal 135 can store the subscriber record and format the message appropriately for transmission to the roamer. Furthermore, messages thereafter received by the terminal 135 for transmission to the roamer can be advantageously processed without additional communication with the home terminal 125.

When the home terminal 125 receives a message for transmission to the roamer prior to transmission of the subscriber record to the local terminal 135, the home terminal 125 automatically contacts the local terminal 135 and forwards both the message and the subscriber record for the roamer to the local terminal 135 for storage thereby. The local terminal 135 can then conveniently transmit both the forwarded message and other received messages to the roamer without ever having to make a request for the subscriber record.

In conventional communication systems, on the other hand, the subscriber record for a pager is never forwarded in its entirety to sub-systems into which a pager has roamed. Instead, each time a local terminal, i.e., one associated with the region into which the pager has roamed, receives a message to be transmitted to the pager, the local terminal must contact the home terminal for message validation. Specifically, the local terminal transmits the message intended for the roamer back to the home terminal. The home terminal then refers to the subscriber record for the roamer and formats the message appropriately. Thereafter, the home terminal returns the formatted message to the local terminal. Additionally, the home terminal provides the local terminal with additional information necessary for transmitting the message.

In some conventional systems, the home terminal "knows" the transmission characteristics, such as transmission frequencies, of other sub-systems into which a pager can roam. In other words, a relatively large amount of memory is required within the home terminal to store transmission characteristics for other sub-systems.. Because the frequencies at which each local terminal transmits are stored by the home terminal, the home terminal need transmit the roamer frequency offset values for only the frequencies utilized by the local terminal. However, other information, such as the home frame, address, and collapse value, must be transmitted as well. It can be seen that transmission of a single message to a roamer requires message validation plus the provision of a relatively large amount of information to the local terminal before the message can ever be transmitted. This time-consuming process can result in message delays that can be critical to roaming subscribers in some instances, such as when the subscriber is a doctor or a police officer. Furthermore, this process must be repeated each and every time the local terminal is to transmit a message to the roamer, resulting in inefficient use of the system that can lead to backlogs and further system delays.

In some other conventional systems, the large amount of memory required for storage of transmission characteristics for every other local terminal is not available. In such a system, upon receiving a message validation request, the home terminal still formats the message, returns the message, and transmits additional information to the local requesting terminal. However, because the transmission characteristics of the requesting terminal are unknown, the home terminal must provide all of the frequency offset values and associated frequencies as well as the home frame, the collapse value, and the address to the local terminal. Although this conventional method saves memory space in the home terminal, it results in even greater inefficiencies since a much greater amount of information must be provided to the local terminal each time a message is to be transmitted to the roamer.

An advantage of system 100 (FIG. 1) according to the present invention is that roamer information, in the form of subscriber records, is efficiently provided to requesting terminals because a subscriber record is only transmitted once to a local terminal 135 providing service in an area into which a pager 140 has roamed. Thereafter, the local terminal 135 processes further messages for the roamer without having to communicate with the home terminal 125. A subscriber of the roaming pager 140 therefore receives messages in a timely fashion, and delays resulting from excess communications between terminals 125, 135 are not introduced into the system 100. Furthermore, the home terminal 125 does not have to waste memory space by storing transmission characteristics for other terminals 130, 135.

A further advantage of the system 100 according to the present invention is that billing information can be conveniently processed by the local terminal 135 since the entire subscriber record has been forwarded by the home terminal 125. The billing information can simply be periodically updated by the local terminal 135 and, during off-peak hours, transmitted to the home terminal 125.. After evaluation of the subscriber billing status, the home terminal 125 can authorize or deny continued paging service for the roamer.

Figure 4:
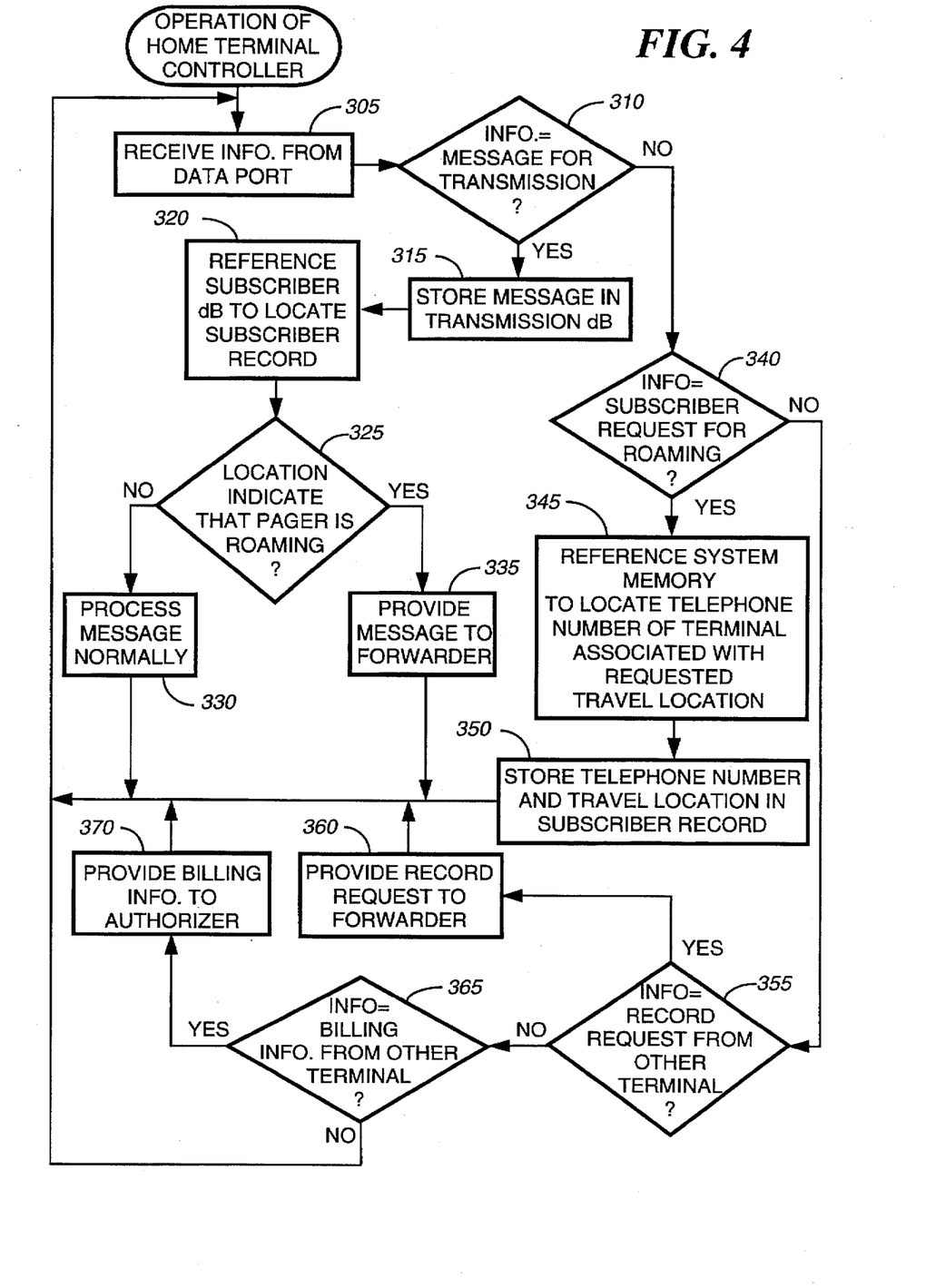
FIG. 4 is a flowchart depicting an operation of a controller included in the home terminal of FIG. 2 according to the present invention.

Referring next to FIG. 4, a flowchart depicts an operation of the home terminal controller 210 (FIG. 2) according to the present invention. At step 305, the controller 210 receives information from the data port 205. When, at step 310, the information comprises a message for transmission to a pager 140, the message is stored, at step 315, in the transmission database 225, and the subscriber database 255 is referenced, at step 320, to locate the subscriber record for the pager 140. At step 325, the controller 210 determines whether the pager 140 is currently within the geographic area of the sub-system 105 or whether the pager 140 is currently roaming in another region. This can be determined by reference to the location information stored in the subscriber record for the pager 140. When the pager 140 is-operating normally within the sub-system 105, the message is transmitted in a conventional fashion, at step 330. When the pager 140 is roaming, the message is provided, at step 335, to the forwarder 275 (FIG. 2).

When, at step 340, the information received by the controller 210 comprises a subscriber roaming request, including at least information indicative of another sub-system, the controller 210 references, at step 345, the system memory 265 to locate the telephone number of the terminal 135 associated with the roaming request. At step 350, the telephone number of the terminal 135 associated with the request is stored in the subscriber record for the pager 140 carried by the subscriber. Although storage of a telephone number in the subscriber record is a convenient way to identify the sub-system 115 into which the pager 140 is roaming, it will be appreciated that any information indicative of the travel location can be alternatively stored in the subscriber record.

When, at step 355, the information received from the data port 205 comprises a record request from another terminal, such as the local terminal 135, the controller 210 provides, at step 360, the record request to the forwarder 275. When, at step 365, billing information from another terminal, such as the local terminal 135, is received, the billing information is provided, at step 370, to the authorizer 270.

Figure 5:
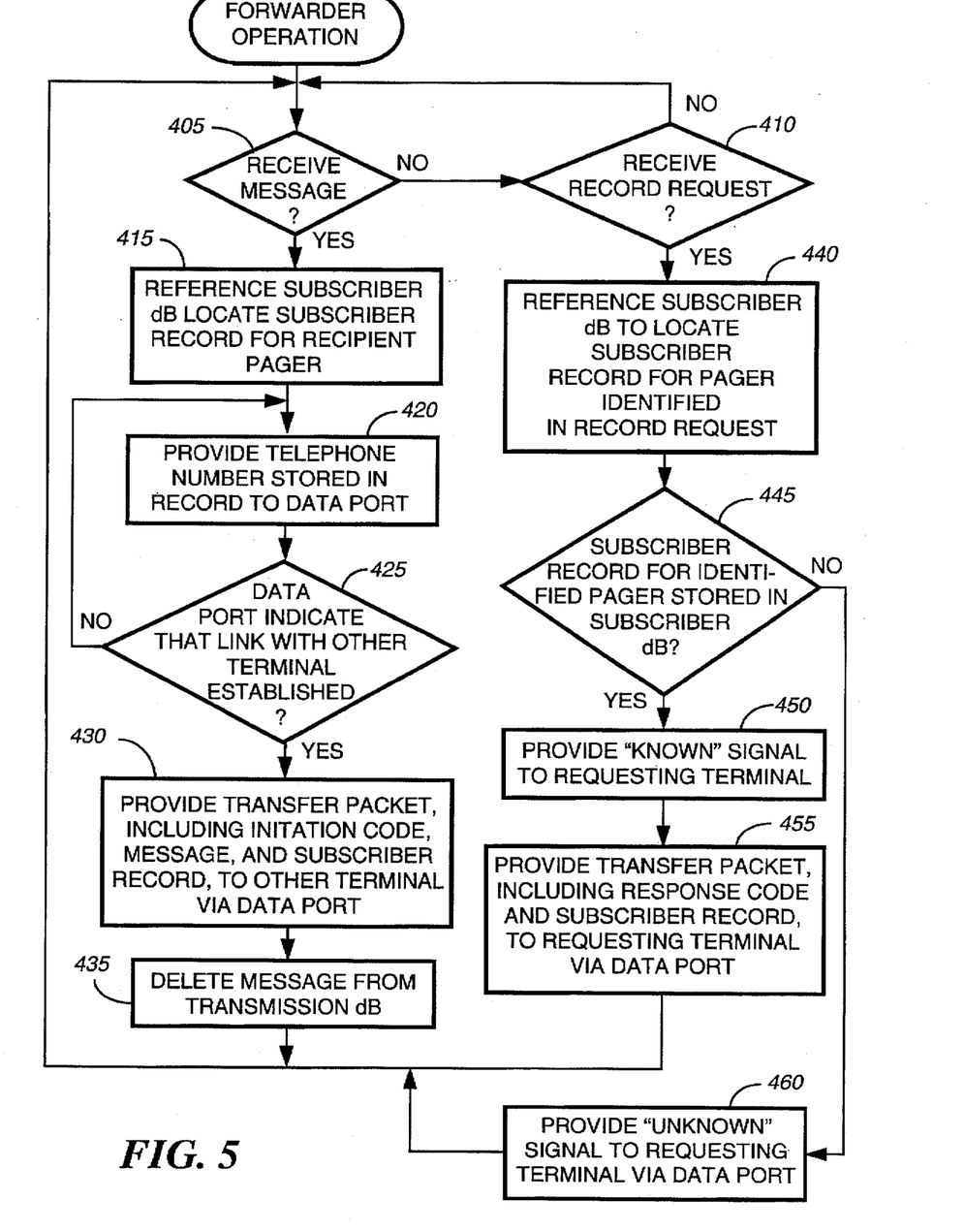
FIG. 5 is flowchart of an operation of a forwarder included in the home terminal of FIG. 2 according to the present invention.

FIG. 5 is a flowchart of an operation of the forwarder 275 included in the home terminal 125 according to the present invention. When the controller 210 receives a message that is intended for reception by a currently-roaming pager 140, the message is provided to the forwarder 275, which receives the message, at step 405. The forwarder 275 then, at step 415, references the subscriber database 255 to locate the subscriber record for the recipient pager 140. A communication link is then established between the home terminal 125 and the local terminal 135 identified in the subscriber record.

The establishment of a communication link with the local terminal 135 can be accomplished, for instance, by providing, at step 420, the telephone number of the local terminal 135 to the data port 205. When, at step 425, a communication link, such as a telephone connection, has been established with the local terminal 135, the forwarder 275 provides a transfer packet over the communication link to the local terminal 135, at step 430. Preferably, the transfer packet comprises the message for the roamer, the entire subscriber record, and an initiation code indicating to the local terminal 135 that the home terminal 125 has initiated the transfer and is providing a message for the roamer. Thereafter, the transferred message can be deleted, at step 435, from the transmission database 225.

As mentioned above, the local terminal 135 can process billing information for roamers. In such a situation, the home terminal 125 preferably provides its telephone number or other identification information to the local terminal 135 as a part of the transfer packet. For instance, the identification information, e.g., the telephone number, could be provided as a part of the subscriber record or could be appended to the subscriber record. The local terminal 135 can then conveniently utilize this information to contact the home terminal 125 at periodic intervals to forward updated billing information thereto.

When, at step 410, the forwarder 275 receives a record request, which includes at least information by which a roaming pager 140 can be identified, the subscriber database 255 is referenced, at step 440, to locate the subscriber record for the roamer. When the subscriber record cannot be located, at step 445, the forwarder 275 generates and transmits, at step 460, an "unknown" signal to the requesting terminal 135 to indicate that the roamer is not a subscriber of the sub-system 105. The requesting terminal 135 can then contact other terminals in an effort to locate the subscriber record for the roamer.

When, at step 445, the subscriber record is located in the subscriber database 255, the forwarder 275 provides, at step 450, a "known" signal to the requesting terminal 135 via the data port 205 and PSTN 120 (FIG. 1). In response to reception of the "known" signal, the requesting terminal 135 maintains the communication link and awaits further information. At step 455, the forwarder 275 provides a transfer packet to the requesting terminal 135. The transfer packet preferably includes the subscriber record for the pager 140 identified in the request as well as a response code indicating that no message accompanies transmission of the subscriber record.

After the subscriber record for the roamer has been transmitted to the local terminal 135, the local terminal 135 can thereafter process messages for the roamer without further communication with the home terminal 125. As a result, the roamer receives messages without delays that can be present in conventional systems. Furthermore, the communication system 100 is not crowded with lengthy transmissions between the home terminal 125 and the local terminal 135 each and every time a message is to be transmitted from the local terminal 135 to the roamer. Another advantage is that it is not necessary for the home terminal 125 to store transmission characteristics, such as transmission frequencies, of the local terminal 135 because the subscriber record is automatically forwarded to the local terminal 135 upon reception of a message by the home terminal 125 or in response to a request from the local terminal 135.

Figure 6:
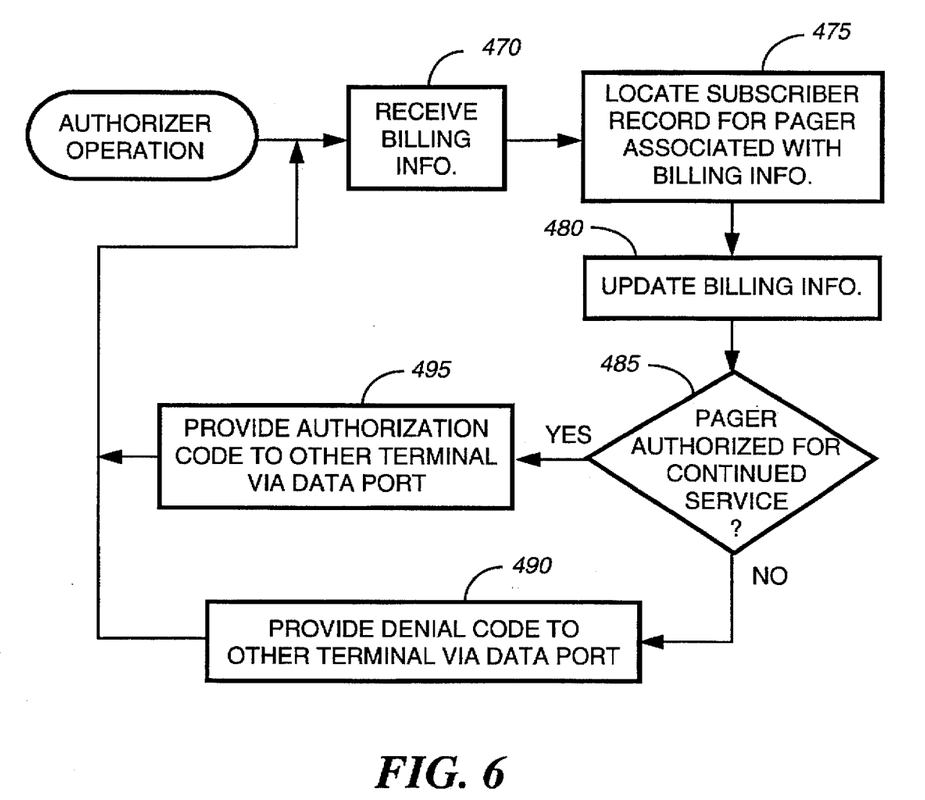
FIG. 6 is a flowchart of an operation of an authorizer included in the home terminal of FIG. 2 according to the present invention.

FIG. 6 is a flowchart illustrating an operation of the authorizer 270 (FIG. 2) according to the present invention. As mentioned above, a feature of the communication system 100 according to the present invention is that the local terminal 135 can conveniently monitor pertinent billing information for a roaming pager 140 because the local terminal 135 stores the subscriber record for the roamer. By way of example, the local terminal 135 could update the billing information stored in the subscriber record by indicating the number and types of messages transmitted to the roamer by the local terminal 135. The updated billing information, including pager identification information, is preferably provided to the home terminal 125 at periodic intervals for a determination of whether continued service is permitted.

At steps 470, 475, the authorizer 270 receives the billing information from the controller 210 and locates the subscriber record for the identified roamer. The authorizer 270 then, at step 480, updates the billing information in the subscriber record and evaluates, 485, the billing status of the subscriber. This can be done by determining whether the subscriber has regularly paid his bill from the service provider operating the home terminal. 125, by determining whether the subscriber has paid for service through a particular time, e.g., the month, or by any other method for determining whether further service is permitted.

When, at step 485, continued service should not be permitted, the authorizer 270 provides, at step 490, a denial code over the communication link to the local terminal 135. When further service is permitted, an authorization code is provided, at step 495, to the local terminal 135. In this manner, the local terminal 135 can terminate or continue service as indicated by the home terminal 125.

Figure 7:
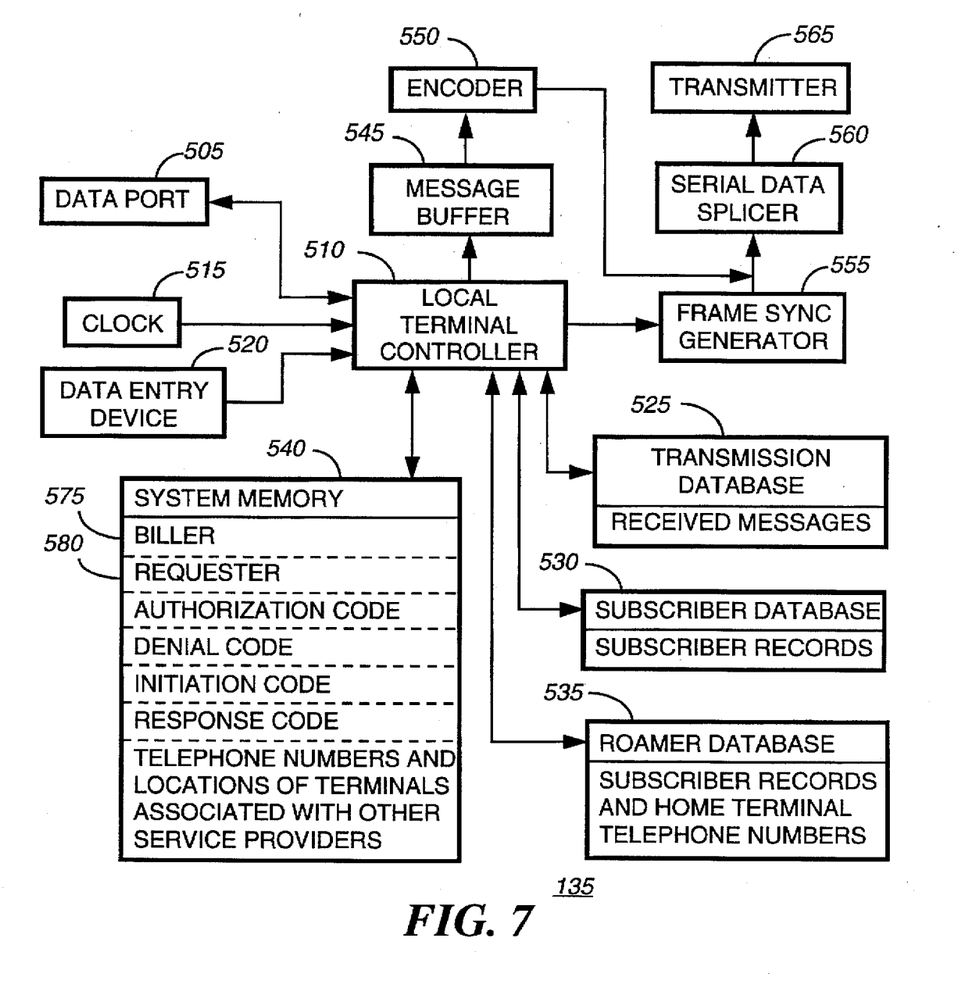
FIG. 7 is an electrical block diagram of a local terminal included in a second sub-system of FIG. 1 for transmitting messages to a roaming pager according to the present invention.

Referring next to FIG. 7, an electrical block diagram of a local terminal, such as the local terminal 135, is depicted. The local terminal 135 preferably comprises a data port 505 or other device, such as a modem, for receiving information. A controller 510 coupled to the data port 505 processes received information and controls the operation of the local terminal 135. Also coupled to the controller 510 are a clock 515 for providing time values to the controller 510, a transmission database 525 for storing received messages that are to be transmitted in the geographic region of the sub-system 115 (FIG. 1), and a data entry device 520 by which a human operator can modify data stored by the terminal 135.

The local terminal 135 further includes a subscriber database 530 for storing subscriber records associated with pagers 140 that normally receive messages from the local terminal 135, and a roamer database 535 for storing subscriber records for those pagers 140 that have roamed into the sub-system 115 of the local terminal. 135. When billing information for roamers is to be processed by the local terminal 135, the roamer database 535 preferably also includes identification information by which the home terminals for the roamers can be identified. This identification information can comprise, for instance, a telephone number indicative of the roamer's home terminal appended to the subscriber record for that roamer or even included as information within the subscriber record.

A system memory 540 is coupled to the controller 510 for storing operational parameters and firmware utilized in operating the local terminal 135. Preferably, the system memory 540 stores identification information, e.g., telephone numbers and/or locations, of other terminals 125, 130 within the communication system 100 (FIG. 1) as well as codes, such as an authorization code, an initiation code, a denial code, and a response code, employed for communicating with other terminals 125, 130.

According to the present invention, a requester 580 is coupled to the controller 510 for automatically requesting the subscriber record of a pager 140 when it is determined that the pager 140 is a roamer for which service is to be provided by the local terminal 135. A biller 575 is also coupled to the controller 510 for updating and periodically transmitting billing information about roamers to home terminals that normally transmit messages to the roamers. The requester 580 and the biller 575 can be implemented in firmware stored in the system memory 540 or, alternatively, in hardware capable of performing equivalent functions.

The controller 510 gathers information to be transmitted during each frame into address, vector, and message fields according to FLEX™ protocol. The information is then coupled to a message buffer 545 for temporarily storing the information until a time for further processing and transmission. Frames are transmitted in numeric sequence, so that while a current frame is being transmitted, information for the next frame to be transmitted is in the message buffer 545, and information for the next frame thereafter is being gathered by the controller 510. At the appropriate time, the information stored in the message buffer 545 is transferred to the encoder 550 for encoding the information into a conventional signaling format such as FLEX™.

The controller 510 next enables a frame sync generator 555, which generates the predetermined sync pattern that is transmitted at the start of each frame transmission. The sync pattern is multiplexed with the encoded information by the serial data splicer 560, which generates a message stream. The message stream is transmitted by a transmitter 565 as a radio signal for reception by pagers 140 located in the geographic region in which service is provided by the sub-system 115.

Figure 8:
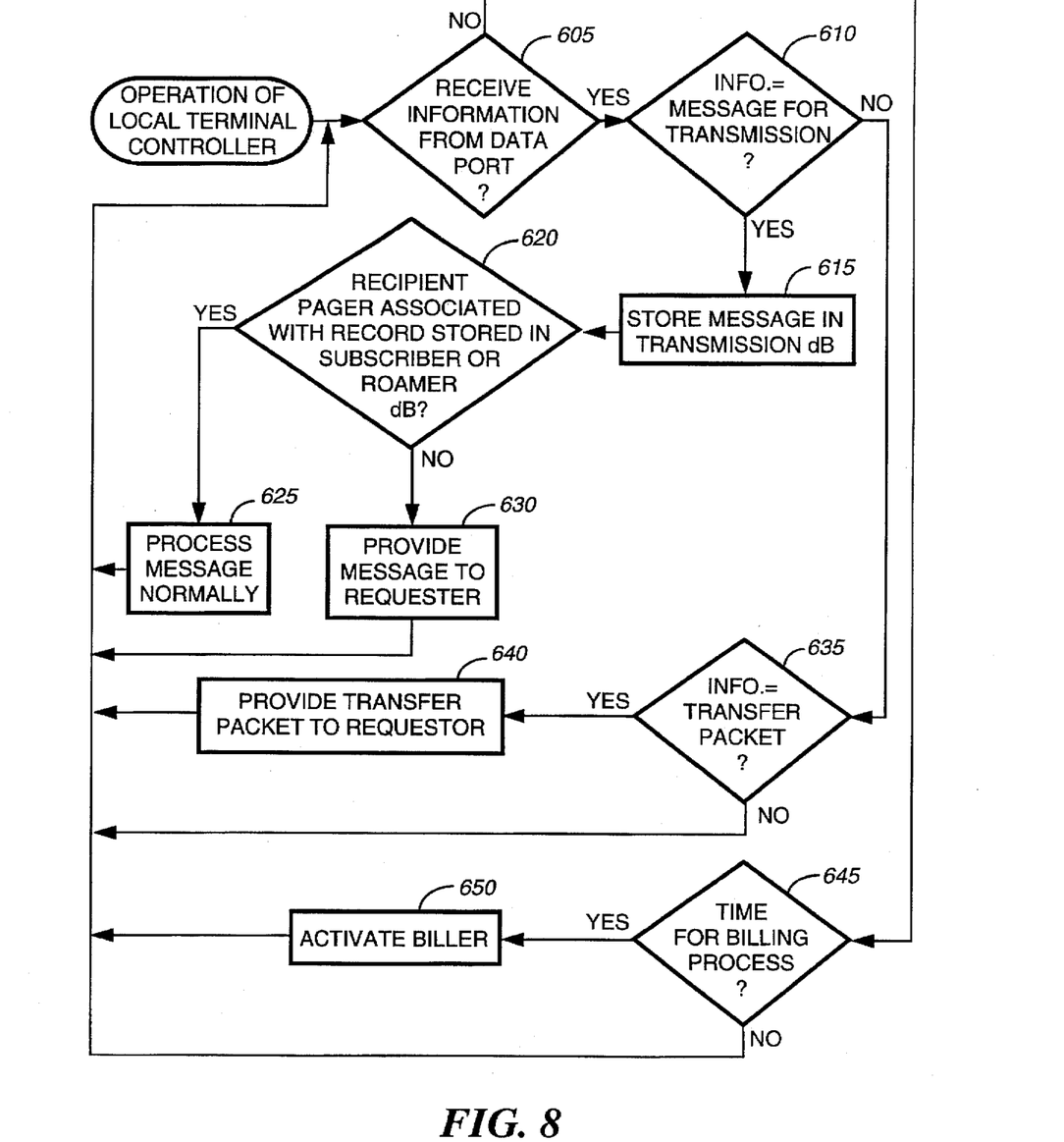
FIG. 8 chart of an operation of a processor included in the local terminal of FIG. 7 in accordance with the present invention.

Referring next to FIG. 8, a flowchart illustrates an operation of the local terminal controller 510 according to the present invention. When, at steps 605, 635, information received via the data port 505 comprises a transfer packet from another terminal, such as the home terminal 125 (FIG. 1), the transfer packet is provided, at step 640, to the requester 580. When, at steps 605, 610, a message for transmission to a pager 140 is received from the data port 505, the message is stored, at step 615, in the transmission database 525. Thereafter, at step 620, the controller 510 references the subscriber and roamer databases 530, 535 to determine whether a subscriber record associated with the recipient pager 140 is stored in either database 530; 535. When, at step 620, the subscriber record is not stored by the local terminal 135, the message is provided, at step 630, to the requester 580.

When a subscriber record for the pager 140 is stored by the terminal 135, the message is processed normally, at step 625. In other words, the message is formatted in accordance with the stored record and transmitted to the pager 140, whether roamer or not, without having to establish communication with the home terminal 125 of the pager 140. As a result, since the subscriber record is already stored for a roaming pager 140, the message can be transmitted quickly without lengthy, time-consuming communication with the home terminal 125. Furthermore, the system 100 (FIG. 1) is not inefficiently overcrowded with communications every time a message is received, as is the case in conventional communication systems in which roaming is permitted.

The normal processing of a message to be transmitted to a roamer can also include referencing the billing information included in the subscriber record for that roamer. When the billing information contains an indication that further service for the roamer is denied, such as when the subscriber has not paid for service, the message can be discarded from the transmission database 525 or stored without transmission for a certain amount of time to allow the subscriber to pay for service or correct billing errors at the home terminal 125.

According to the present invention, the local terminal 135 can update and process billing information for roaming pagers 140. When, at step 645, the controller 510 determines that it is time for the billing process to occur, the controller 510 activates, at step 650, the biller 575 (FIG. 7). The controller 510 can, for example, periodically activate the biller 575 at predetermined off-peak times. Alternatively, the controller 510 can activate the biller 575 when it is determined that very little message traffic is present in the sub-system 115 of the local terminal 135.

Figure 9:
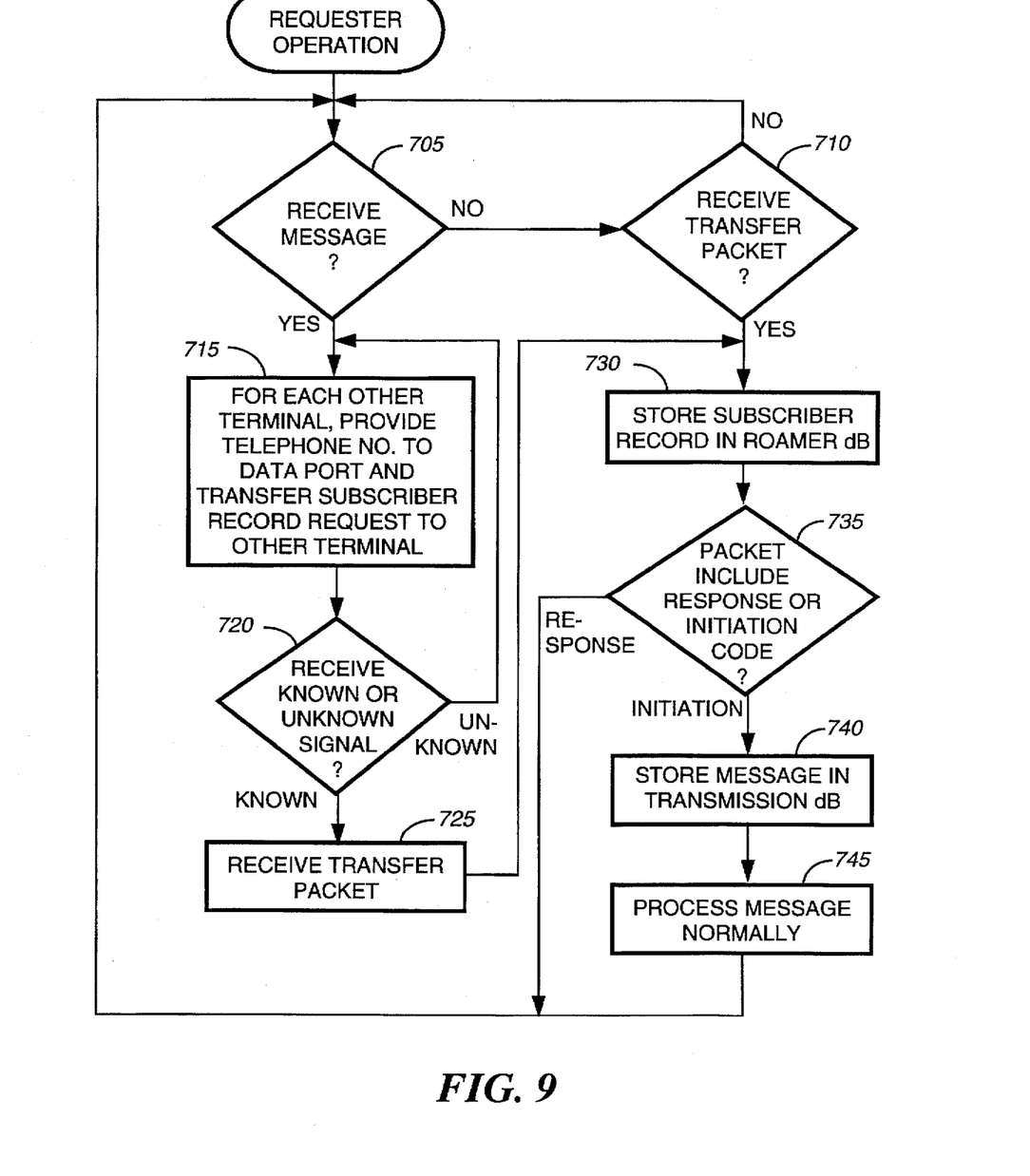
FIG. 9 is flowchart depicting an operation of a requester included in the local terminal of FIG. 7 in accordance with the present invention.

FIG. 9 is a flowchart of an operation of the requester 580 included in the local terminal 135. When, at step 710, the requester 580 receives a transfer packet from the controller 510, the subscriber record included in the transfer packet is stored, at step 730, in the roamer database 535 (FIG. 7). When, at step 705, the requester 580 receives a message intended for a roamer that has entered the sub-system 115, pager identification information, such as subscriber information or an address, is retrieved from the message. Thereafter, at step 715, the requester 580 establishes successive communication links with other terminals 125, 130 in the communication system 100 and provides a record request, including at least the pager identification information, successively to each other terminal 125, 130 for recognition thereby. In other words, the requester 580 calls a terminal, such as the terminal 130, operating in a different sub-system 110.

When a communication link is established, the requester 580 transmits a subscriber record request, including the pager identification information, to the other terminal 130. When, at step 720, an "unknown" signal is received, indicating that the terminal 130 does not recognize the pager identification information, the requester 580 severs communication with that terminal 130 and contacts another terminal. This process continues until the requester 580 receives, at step 720, a "known" signal from a terminal, such as the home terminal 125.

The "known" signal indicates that the terminal 125 recognizes the pager identification information and currently has a subscriber record for the identified roaming pager 140. The "known" signal further indicates that the local terminal 135 should maintain the communication link and await reception of a transfer packet from the home terminal 125, at step 725. The requester 580 thereafter, at step 730, stores the subscriber record included in the transfer packet in the roamer database 535. When the local terminal 135 is to process billing information for the roamer, the transfer packet preferably also includes home terminal identification information, such as a telephone number of the home terminal 125. This information can be either included as a part of the forwarded subscriber record or provided along with the subscriber record. In either situation, the home terminal identification information is preferably stored in the roamer database 535.

Once a transfer packet has been received, at steps 710, 725, and the subscriber record therein has been stored, at step 730, the requester 580 determines whether the transfer packet includes a response code or an initiation code, at step 735. According to the present invention, the presence of an initiation code in the transfer packet indicates that the transfer packet additionally includes a message to be transmitted to the roaming pager 140. When, at step 735, an initiation code is included, the message is stored, at step 740, in the transmission database 525. The controller 510 can then format the message according to the subscriber record and transmit the formatted message in a normal manner, at step 745. Reception, at step 735, of a response code in the transfer packet indicates that no message has been forwarded from the home terminal 125.

Figure 10:
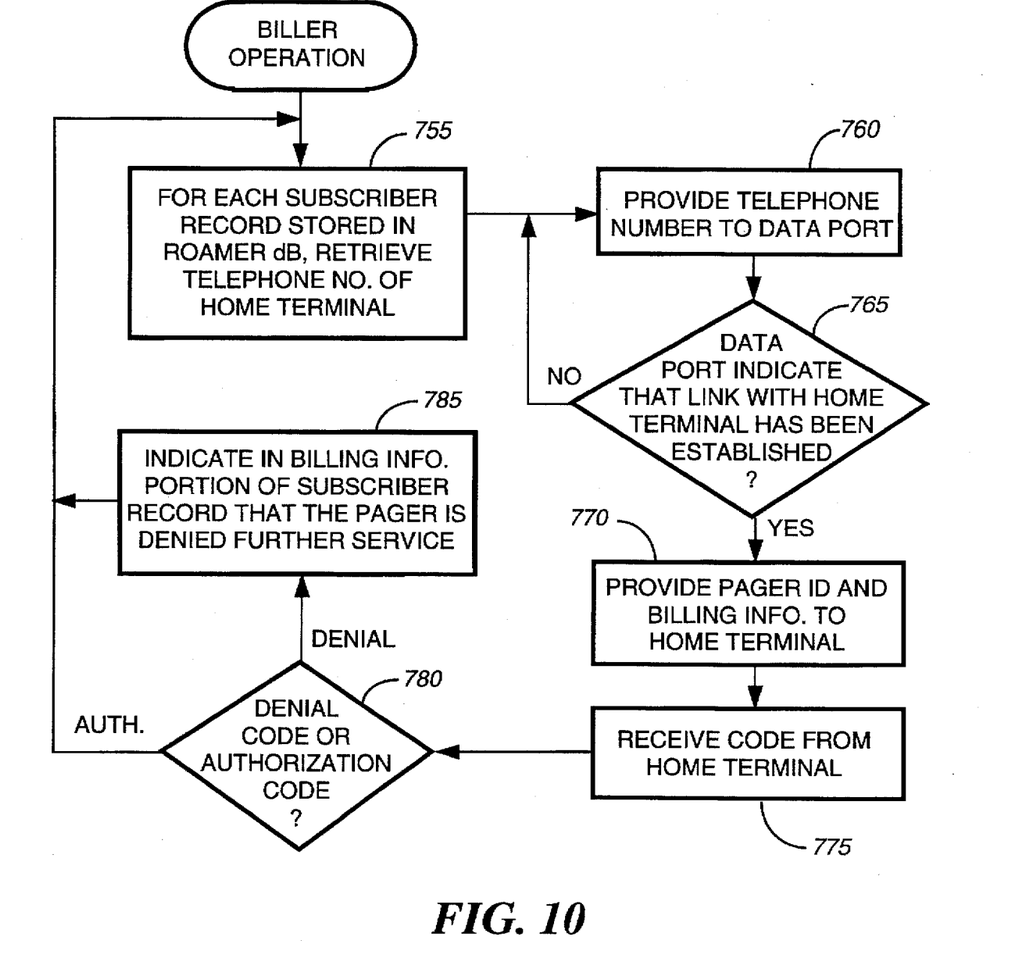
FIG. 10 is a flowchart of an operation of a biller included in the local terminal of FIG. 7 in accordance with the present invention.

Referring next to FIG. 10, a flowchart depicts an operation of the biller 575 according to the present invention. When activated by the controller 510, the biller 575 performs a billing process for each designated roamer. At step 755, the biller 575 retrieves the telephone number of the home terminal 125 associated with a roamer from the roamer database 535. Thereafter, the telephone number is provided, at step 760, to the data port 505. When, at step 765, communication has been established with the home terminal 125, the biller 575 provides, at step 770, pager identification information and updated billing information for the roamer to the home terminal 125. Communication is preferably maintained until reception, at step 775, of a code from the home terminal 125. When, at step 780, the code comprises an authorization code, the local terminal 135 continues to provide messaging service to the roamer. When, at step 780, the received code comprises a denial code, the subscriber record for the roamer is modified, at step 785, to indicates that further service for the roamer is denied.

The update of billing information in the subscriber record for a roamer can be accomplished, for instance, by modifying the billing information to reflect a number of days during which the roamer received messages, the number of messages received by the roamer, or any other information indicative of paging services utilized by the roamer in the sub-system 115 of the local terminal 135. This updated billing information is preferably used by the home terminal 125 to evaluate the propriety of continuing paging service to the roamer.

The home terminal 125 and the local terminal 135 have been described as utilizing different elements, such as the authorizer 270 (FIG. 2), the forwarder 275, the biller 575 (FIG. 7), and the requester 580, for illustration purposes only. It will be appreciated that the listed elements can be included in all sub-system terminals 125, 130, 135, and that methods within the home terminal 125 and local terminal 135 can be performed within all sub-system terminals 125; 130, 135. In this manner, every sub-system terminal 125, 130, 135 operates as a home terminal with respect to pagers 140 to which messages are normally sent by the terminal, and every sub-system terminal 125, 130, 135 operates as a local terminal with respect to pagers 140 that roam into the sub-system from other geographic regions. As a result, all of the terminals 125, 130, 135 within the communication system 100 according to the present invention receive and store subscriber records for roamers after a single communication session with the home terminals for the roamers. System overcrowding, delays, and inefficiencies due to multiple communication sessions are therefore advantageously eliminated from the communication system 100.

According to the present invention, a local terminal can also be treated as a temporary home terminal by a roaming pager. By way of example, a subscriber who has roamed from a home terminal in Miami to a local terminal in Tokyo can thereafter decide to roam to London. He can call the Miami terminal to make a roaming request or simply call the Tokyo terminal. In response to the roaming request, the Tokyo terminal can act as a temporary home terminal for the pager. In other words, upon reception of a message for the roamer, the Tokyo terminal can automatically forward the subscriber record of the pager to the London terminal and identify either itself or the Miami terminal as the home terminal. If the London terminal receives a message for the roamer prior to storage of the subscriber record, it preferably sends out a record request in the manner described in FIG. 9. Once the London terminal receives the subscriber record for the roamer, it can then format messages and transmit messages for the roamer without further communication with the true home terminal in Miami or the temporary home terminal in Tokyo. Furthermore, the London terminal can process billing information for the roamer in the manner described in FIG. 10.

In summary, the communication system as described above includes communication sub-systems among which a pager can roam and still receive messages. The user of a pager subscribes for service in a first sub-system in which a home terminal normally transmits messages to his pager. When the subscriber travels to a location within a second sub-system, he can call the home terminal to request roaming. Thereafter, when a next message is received by the home terminal for the roamer, the message and the entire subscriber record for the roamer are advantageously forwarded to the local terminal transmitting in the second sub-system. In this manner, the local terminal can conveniently store the subscriber record and format the message according to the subscriber record.

When the local terminal receives a message for transmission to the roamer before the subscriber record has been forwarded, the local terminal automatically transmits a record request for the subscriber record. The home terminal receives the request and forwards the subscriber record, which is stored by the local terminal. Once the local terminal has stored the subscriber record, it can process messages for the roamer without further communication with the home terminal.

In conventional systems, a local terminal must request message validation from a home terminal each and every time a message is to be transmitted to a roamer by the local terminal. As a result, the system is crowded with a multitude of validation requests and transmissions between terminals. Because a relatively large amount of information must be transmitted from a home terminal to a local terminal in response to every message validation request, the process can result in message transmission delays and inefficient use of system communication resources. Furthermore, in some conventional systems, storage space in home terminals must be immense to accommodate storage of transmission characteristics for other terminals so that the home terminals can format messages appropriately.

In the communication system according to the present invention, the home terminal need not store transmission characteristics for every local terminal in the system. Therefore, relatively little memory space is required in the home terminal for storage of information related to the local terminals in the system.

It will be appreciated by now that there has been provided a method and apparatus for more efficient roaming between communication systems.

What is claimed is:

1. A method for efficient roaming among at least a home communication sub-system and a local communication sub-system, wherein the home communication sub-system comprises a home terminal from which a portable communication device normally receives messages within a first geographic area, and wherein the local communication sub-system comprises a local terminal that transmits within a second geographic area, the method comprising, in the home communication sub-system, the steps of:

receiving a message for transmission to the portable communication device;

determining that the portable communication device is roaming within the local communication sub-system; and automatically providing the message and a subscriber record associated with the portable communication device to the local communication sub-system without first receiving a request for the subscriber record from the local communication sub-system.

2. The method of claim 1, further comprising, in the local communication sub-system, the steps of:

receiving the subscriber record associated with the portable communication device from the home communication sub-system; and transmitting the message to the portable communication device in accordance with the subscriber record.

3. The method of claim 2, further comprising, in the local communication sub-system, the steps of:

storing, subsequent to receiving the subscriber record, the subscriber record in a roamer database; and formatting, prior to transmitting the message, the message according to the subscriber record.

4. The method of claim 3, further comprising, in the local communication system, the steps of:

receiving a further message for transmission to the portable communication device;

automatically formatting the further message according to the subscriber record without communicating with the home communication sub-system; and transmitting the further message to the portable communication device.

5. The method of claim 4, wherein the subscriber record includes billing information for the portable communication device, and wherein the method further comprises the steps of:

the local communication sub-system periodically updating the billing information in the subscriber record associated with the portable communication device; and the local communication sub-system periodically transmitting the billing information to the home communication sub-system for processing thereby.

6. The method of claim 5, further comprising, responsive to transmission of the billing information, the steps of:

the local communication sub-system receiving an authorization code from the home communication sub-system when continued service to the portable communication device is authorized; and the local communication sub-system receiving a denial code from the home communication sub-system when continued service to the portable communication device is denied.

7. The method of claim 1, wherein the determining step comprises, in the home terminal, the steps of:

retrieving identification information associated with the portable communication device from the message;

comparing the identification information to information stored in a subscriber database to locate the subscriber record associated with the portable communication device; and determining that location information within the subscriber record indicates that the portable communication device has roamed into the second geographic area in which the local terminal transmits.

8. The method of claim 7, wherein the providing step comprises, in the home terminal, the steps of:

establishing a communication link between the home terminal and the local terminal; and transmitting the message and the subscriber record to the local terminal over the communication link.

9. A communication system for providing messages to a portable communication device, the communication system comprising:

a local sub-system comprising a local terminal for transmitting the messages to the portable communication device when the portable communication device has roamed into a first geographic area associated with the local sub-system; and a home sub-system comprising a home terminal for normally transmitting the messages to the portable communication device in a second geographic area associated with the home sub-system, the home sub-system comprising:

a data port for receiving a message for transmission to the portable communication device;

a controller coupled to the data port for determining that the portable communication device is roaming within the local sub-system; and a forwarder coupled to the controller for automatically providing the message and a subscriber record associated with the portable communication device to the local sub-system in response to determining that the portable communication device is roaming and without first receiving a request for the subscriber record from the local sub-system.

10. The communication system of claim 9, wherein the local sub-system comprises:

receiving means for receiving the subscriber record from the home sub-system; and a transmitter coupled to the receiving means for transmitting the message to the portable communication device in accordance with the subscriber record.

11. The communication system of claims 10, wherein the local sub-system further comprises:

a roamer database coupled to the receiving means for storing the subscriber record associated with the portable communication device, wherein the message is formatted in accordance with the subscriber record prior to transmission of the message.

12. The communication system of claim 11, wherein:

the subscriber record comprises at least a home frame assigned to the portable communication device; and the local terminal automatically formats further messages for the portable communication device without establishing communication with the home Sub-system.

13. The communication system of claim 12, wherein the subscriber record further comprises types of messages that the portable communications device can receive, addresses associated with the portable communication device, frequency offset values, collapse values, and billing information for the portable communication device.

14. The communication system of claim 13, wherein the local sub-system further comprises:

a biller for periodically updating the billing information in the subscriber record, for periodically transmitting the billing information to the home sub-system, and for permitting or denying further service to the portable communication device based on a response from the home sub-system.

15. The communication system of claim 14, wherein the home sub-system further comprises:

an authorizer for receiving the billing information from the local sub-system, for transmitting an authorization code to the local sub-system when further service for the portable communication device is authorized, and for transmitting a denial code to the local sub-system when further service for the portable communication device is denied.

16. The communication system of claim 9, wherein the home sub-system further comprises:

a subscriber database coupled to the controller for storing the subscriber record, wherein the subscriber record includes location information indicating that the portable communication device has roamed into the second geographic area in which the local sub-system provides service.

* * * * *